Jan. 21, 1964   R. E. FISCHELL ETAL   3,118,637
MAGNETIC ATTITUDE CONTROL
Filed March 30, 1961

Robert E. Fischell
Theodore Wyatt
INVENTORS

BY W. O. Quesenberry
Claude Funkhouser
ATTORNEYS

3,118,637
MAGNETIC ATTITUDE CONTROL
Robert E. Fischell and Theodore Wyatt, Silver Spring, Md., assignors to the United States of America as represented by the Secretary of the Navy
Filed Mar. 30, 1961, Ser. No. 99,644
6 Claims. (Cl. 244—1)

The present invention relates in general to satellite control and more specifically to attitude control for earth satellites.

The invention relates broadly to satellites which employ solar cells located on selected portions of the satellite shell for the generation of power. The Tiros and Transit satellites are among the group which locates the solar cells in a band about the perimeter of the satellite body. For satellites having this solar cell configuration, the power generated by the cells is a function of the attitude of the satellite with respect to the sun.

If the satellite axis is made to undergo essentially the full gamut of angular attitudes with respect to the sun, the average power generated by the solar cells will exceed the power that would be produced if the satellite assumed the most adverse attitude. It is thus seen that attitude is a very important factor in the generation of power from solar energy.

The invention relates specifically to a system for utilizing the interaction of a relatively strong magnetic dipole in the satellite with the earth's magnetic field to achieve an orientation which will insure realization of a high solar cell power output.

It is an object of the present invention to provide a means for controlling the attitude of earth satellites in orbit.

Another object of the invention is to provide a device of simple construction for controlling the attitude of an earth satellite in orbit so as to make possible the use of directional antennae.

Still another object of the invention is to provide a simple device which is compact, lightweight, and highly dependable for controlling the attitude of an earth satellite in orbit.

A further object of the invention is to provide a simple magnetic device which will maintain a satellite in a fixed orientation in the earth's magnetic field regardless of short term variations in the magnetic field.

Other objects and many of the attendant advantages of the present invention will be readily appreciated as the same becomes better understood by reference to the following detailed description when considered in connection with the accompanying drawings, wherein.

At an altitude above the earth of 500 nautical miles the magnetic field of the earth varies in intensity from 0.226 oersted at the equator to approximately 0.4 oersted at the poles. If the satellite is not spinning, a permanent magnet installed within will cause the satellite to orient itself along the direction of this field. However, when the satellite is spinning at an appreciable rate it will react like a gyroscope and prevent magnetic orientation. When the satellite is spinning at a nominal rate of 1.0 r.p.s., a magnet within the satellite will cause attitude deviations of less than ±1 degree per orbital revolution from the orientation at injection. It is not until the angular speed of rotation of the satellite is reduced below .01 r.p.s. that appreciable attitude deviations with respect to the sun are attainable.

A means for sufficiently reducing the angular rotation of a satellite in space so that magnetic attitude control is possible is disclosed in application Serial No. 83,603, filed January 18, 1961, of Robert E. Fischell. The despin mechanism therein disclosed consists of a plurality of permeable rods having shorted coils of wire wound on their center portions. As these rods rotate in the earth's magnetic field, the eddy current and hysteresis losses in the rod and the losses produced in the shorted coils are sufficient to eliminate all angular motion of the satellite in a finite period of time.

Figure 1:
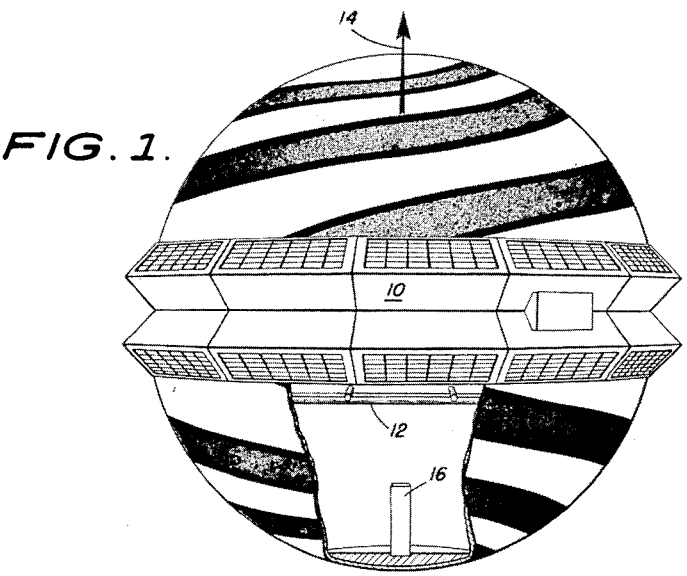
FIG. 1 is a cutaway view of a satellite embodying the features of the invention.

FIG. 1 discloses an earth satellite of a general spherical configuration. The satellite contains two banks of solar cells 10 extending about the equator of the sphere and inclined at an angle of 45° for maximum energization. In planes above and below the solar cell banks 10 there is provided a plurality of permeable rods 12 for effecting despin of the satellite in orbit according to the above cited patent application of Robert E. Fischell. Located in the lower portion of the satellite on the spin axis 14 is a permanent magnet 16 according to the invention. The magnet is preferably oriented within the satellite with its axis perpendicular to the plane of the despin mechanism so that maximum despin is made possible at low spin rates.

If a satellite containing a magnetic dipole moment is spinning slow enough that gyroscopic effects are negligible, the satellite will align itself along the direction of the magnetic field. The earth's magnetic field is similar to the field produced by a current-carrying coil or a bar magnet located at the center of the earth. The horizontal component of the earth's field can be described as having a general north and south direction with the magnetic lines leaving the north pole and entering the south pole. Thus in following the earth's magnetic field, a satellite having a dipole moment will experience angular fluctuations in its longitudinal axis which depend for the most part on the orbital inclination of the satellite (angle of orbit with earth's equator).

Figure 2:
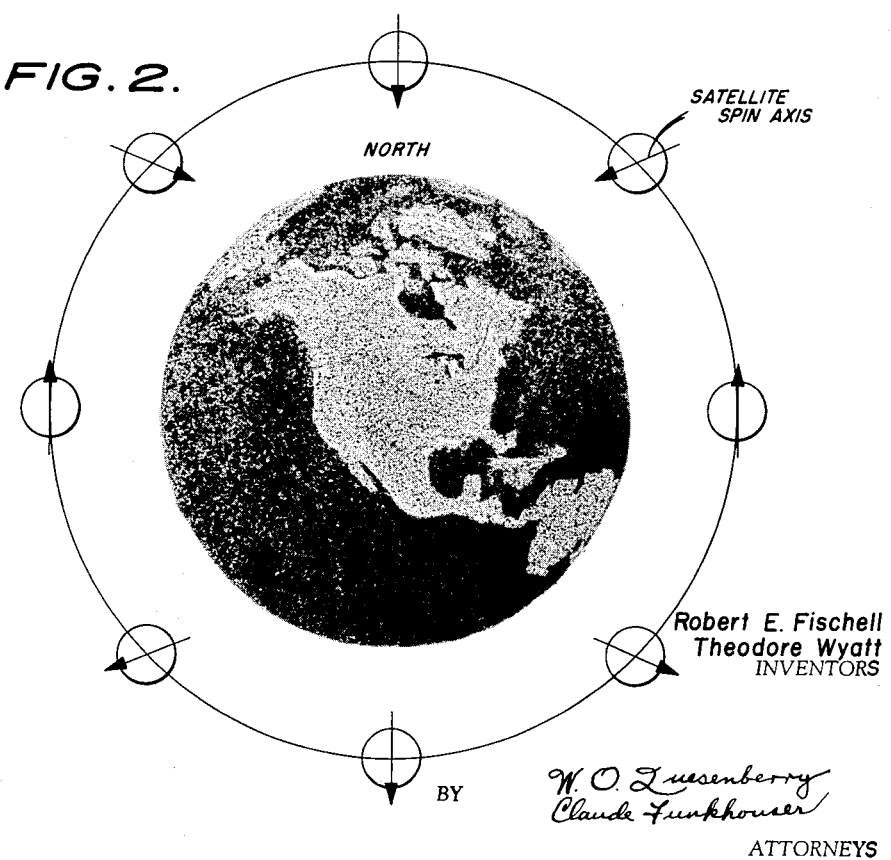
FIG. 2 is a schematic representation of the angular excursions of a satellite embodying the invention in a polar orbit.

FIG. 2 shows that for a polar orbit ($i=90°$) the spin axis of the satellite will undergo the largest angular excursions with respect to the earth's spin axis. For this angle of excursion the satellite would actually tumble end over end twice in each orbital period. For non-polar orbits the motion of the spin axis of the satellite is more complicated. Where the orbital inclination is less than 90°, the spin axis of the satellite will actually describe a cone as the satellite traverses its orbit. As the orbital inclination of the satellite grows smaller, the apical angle of the cone will grow smaller until at zero degrees inclination with the equator, the spin axis of the satellite will remain in a general north-south orientation.

In addition to this synchronous tumbling due to the general configuration of the earth's magnetic field, angular fluctuations in the satellite's longitudinal axis will be induced by localized variations in the field. These variations in the total component of the earth's magnetic field may change by nearly as much as ±180° with respect to the earth's spin axis and appear as holes and hills in the overall gradient configuration of the earth's field.

It is, therefore, necessary to make the moment of inertia of the satellite sufficiently large and its magnetic dipole sufficiently small that short term variations in the satellite's orientation will be held to a minimum. The invention calls for the use of a magnet in the satellite that is only strong enough to be affected by the long term average direction of the earth's magnetic field. On the average the only component of the earth's field that will affect the satellite is that which is parallel to the horizontal field component. All components of the magnetic field perpendicular to this horizontal component will cancel out over the satellite's orbital path.

The particular orientation of the satellite depends upon the positioning of the magnet within the satellite structure. The satellite will align itself in space with the axis of the magnet in line with the earth's magnetic field. Therefore any orientation may be achieved by proper location of the magnet within the satellite body. With proper orientation of the satellite with respect to the sun more effective utilization of the solar cells is possible. If, for example, the axis of the satellite could be maintained in an orientation within ±30° with respect to the ecliptic, it would be possible to use fewer solar cells to get the same power on the same number of solar cells to obtain a much greater amount of power. Furthermore, if the satellite is oriented with respect to the earth it is possible to achieve a more desirable radiation pattern from the satellite antenna such that a directional antenna may be used. This would serve to give a more powerful transmission.

It has been found through experimentation that a magnet having the following statistics is preferable for a proper carrying out of the invention:

(1) Length: 4.0 inches
(2) Diameter: 0.5 inch
(3) Weight: 0.21 lbs.
(4) Remanence: 10,500 gausses
(5) Coercive force: 575 oersteds
(6) Magnetic dipole moment: $0.8 \times 10^4$ unit-pole cm.

Obviously, many modifications and variations of the present invention are possible in the light of the above teachings. It is therefore to be understood that within the scope of the appended claims the invention may be practiced otherwise than as specifically described.

What is claimed is:

1. In an earth satellite a plurality of permeable magnetic rods for effecting despin of the satellite in space and magnetic means for orienting the satellite in a particular attitude with respect to the earth.

2. An earth satellite as defined in claim 1 wherein said magnetic means comprises a permanent magnet.

3. An earth satellite as defined in claim 2 wherein said permanent magnet is of such strength that the satellite will maintain a fixed orientation with respect to the earth regardless of orbital variations in the direction of the earth's magnetic field.

4. A space vehicle having a spherical body, a plurality of permeable rods lying in two parallel planes within the sphere for eliminating angular motion of the satellite in space, and magnetic means positioned with its axis perpendicular to said planes for controlling the attitude of the satellite in space.

5. A space vehicle as recited in claim 4 wherein said magnetic means comprises a permanent magnet.

6. A space vehicle as recited in claim 5 wherein said permanent magnet is strong enough to be affected only by the long term average direction of the earth's magnetic field.

References Cited in the file of this patent

"The Transit Program," Astronautics, June 1960, pp. 30, 31, 104, 105.

Advances in Space Science, vol. 2, 1960 edited by Frederick I. Ordway, III, Academic Press.